US012717825B2

(12) United States Patent
Singh et al.

(10) Patent No.: US 12,717,825 B2
(45) Date of Patent: Aug. 25, 2026

(54) METHOD AND SYSTEM FOR AUTOMATED INFORMATION MANAGEMENT

(71) Applicant: JPMorgan Chase Bank, N.A., New York, NY (US)

(72) Inventors: Kuldeep Singh, East Lansing, MI (US); Simerjot Kaur, Jersey City, NJ (US); Charese Smiley, Bristol, WI (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 311 days.

(21) Appl. No.: 18/368,845

(22) Filed: Sep. 15, 2023

(65) Prior Publication Data

US 2025/0094462 A1 Mar. 20, 2025

(51) Int. Cl.

*G06F 16/3332* (2025.01)
*G06F 16/3329* (2025.01)
*G06F 40/205* (2020.01)
*G06F 40/40* (2020.01)

(52) U.S. Cl.

CPC ...... *G06F 16/3334* (2019.01); *G06F 16/3329* (2019.01); *G06F 40/205* (2020.01); *G06F 40/40* (2020.01)

(58) Field of Classification Search

CPC .... G06F 40/30; G06F 40/284; G06F 16/3344; G06F 16/3338; G06F 16/24578; G06F 16/3325; G06F 16/00; G06F 16/287; G06F 16/144; G06F 16/148; G06F 16/24; G06F 16/3328; G06F 16/345

See application file for complete search history.

(56) References Cited

U.S. PATENT DOCUMENTS 8,468,122 B2 * 6/2013 Tunstall-Pedoe ............................ G06F 16/24534 707/790
2010/0005386 A1 * 1/2010 Verma .................. G06F 40/289 715/237
2016/0180242 A1 * 6/2016 Byron .................... G06N 5/041 706/11
2018/0165580 A1 * 6/2018 Boyer ..................... G06F 16/00
2023/0030086 A1 * 2/2023 Martinez Ayala .... G06F 16/367
(Continued)

OTHER PUBLICATIONS

Kaur et al, "REFinD: Relation extraction financial dataset", Jul. 2023, InProceedings of the 46th international ACM SIGIR conference on research and development in information retrieval Jul. 1, 20239 (pp. 3054-3063). (Year: 2023).*

*Primary Examiner* — Olujimi A Adesanya
(74) *Attorney, Agent, or Firm* — Greenblum & Bernstein, P.L.C.

(57) ABSTRACT

A method for facilitating automated information management by using predictive analytics is disclosed. The method includes receiving, via a graphical user interface, a request that includes a question in a natural language format; generating, by using a first model, queries based on the question, each of the queries corresponding to a stand-alone component of the question; identifying, from a data repository, data sections for each of the queries, each of the data sections relating to a page in an electronic document; determining, by using a second model, contextual information for each of the queries from the corresponding data sections; and generating, by using a third model, a response for the request based on the queries and the corresponding contextual information.

16 Claims, 7 Drawing Sheets

(56) References Cited

U.S. PATENT DOCUMENTS

2023/0101588 A1* 3/2023 Dasdan ................ G06F 40/106
715/234
2023/0206329 A1* 6/2023 Cella .................. G06F 21/6245
2023/0409647 A1* 12/2023 Fleming ................ G06N 20/00
2024/0202582 A1* 6/2024 Schillace ............... G06N 20/00
2024/0370658 A1* 11/2024 Zhang .................. G06F 40/242
2024/0386216 A1* 11/2024 Sodhi ..................... G06F 40/40
2024/0411757 A1* 12/2024 Duggirala ......... G06F 16/24542
2024/0412003 A1* 12/2024 Heller ..................... G06F 40/35
2025/0005021 A1* 1/2025 Mudulodu ........ G06F 16/24534
2025/0061139 A1* 2/2025 Levinson ............ G06F 16/3326
2025/0094480 A1* 3/2025 Shi ...................... G06F 16/3344
2025/0103640 A1* 3/2025 Dicklin ............... G06F 16/3334

* cited by examiner

METHOD AND SYSTEM FOR AUTOMATED INFORMATION MANAGEMENT

BACKGROUND

1. Field of the Disclosure

This technology generally relates to methods and systems for managing information, and more particularly to methods and systems for facilitating automated information management by leveraging machine learning and artificial intelligence to automatically identify, extract, and contextualize natural language data.

2. Background Information

Many business entities maintain a vast corpus of various types of documents that contain information necessary for business operations. Often, these documents include textual documents such as, for example, annual reports, quarterly reports, and risk management reports. Historically, implementations of conventional information management techniques have resulted in varying degrees of success with respect to leveraging the extensive information that are available in these types of documents.

One drawback of the conventional information management techniques is that in many instances, a significant amount of valuable information is encapsulated textually in a natural language format. As a result, harnessing this valuable information by using the conventional techniques is ineffective and requires large resource investments. Additionally, due to complexities related to processing natural language data, effectively identifying relevant information from within the vast corpus is not feasible.

Therefore, there is a need for a hierarchical end-to-end pipeline that leverages machine learning and artificial intelligence to automatically identify, extract, and contextualize natural language data to facilitate downstream functionalities such as, for example, open-domain question answering, search and discovery, as well as advanced analytics.

SUMMARY

The present disclosure, through one or more of its various aspects, embodiments, and/or specific features or sub-components, provides, inter alia, various systems, servers, devices, methods, media, programs, and platforms for facilitating automated information management by leveraging machine learning and artificial intelligence to automatically identify, extract, and contextualize natural language data.

According to an aspect of the present disclosure, a method for facilitating automated information management by using predictive analytics is disclosed. The method is implemented by at least one processor. The method may include receiving, via a graphical user interface, at least one request, each of the at least one request may include a question in a natural language format; generating, by using a first model, at least one query based on the question, each of the at least one query may correspond to a stand-alone component of the question; identifying, from a data repository, at least one data section for each of the at least one query, each of the at least one data section may relate to a page in an electronic document; determining, by using a second model, contextual information for each of the at least one query from the corresponding at least one data section; and generating, by using a third model, a response for each of the at least one request based on the at least one query and the corresponding contextual information.

In accordance with an exemplary embodiment, the method may further include generating rationale information for the response, the rationale information may include a logical basis for the response; generating at least one graphical element for the response, each of the at least one graphical element may relate to a graphical representation of the response and the rationale information; and displaying, via the graphical user interface, the at least one graphical element.

In accordance with an exemplary embodiment, to generate the at least one query, the method may further include decomposing, by using the first model, the question into the at least one query; identifying, by using the first model, at least one query characteristic for each of the at least one query, the at least one query characteristic may include at least one from among a name characteristic and a time characteristic; and associating the at least one query characteristic with the corresponding at least one query.

In accordance with an exemplary embodiment, to identify the at least one data section for each of the at least one query, the method may further include retrieving, from the data repository, at least one document based on a corresponding at least one query characteristic; identifying a document context for each of the at least one document; and ranking the at least one document based on the document context, a frequency of at least one query term, and a length attribute.

In accordance with an exemplary embodiment, the method may further include determining a selection of the at least one document based on a result of the ranking; and identifying the at least one data section from the selection.

In accordance with an exemplary embodiment, to determine the contextual information for each of the at least one query, the method may further include extracting, by using the second model, at least one data set from an organizational structure of the at least one data section, the organizational structure may include at least one from among a paragraph structure and a table structure; and determining, by using the second model, the contextual information based on a classification of the at least one data set.

In accordance with an exemplary embodiment, to generate the response for each of the at least one request, the method may further include determining, by using the third model, at least one prompt based on the at least one query, the contextual information, and at least one in-context learning sample; and generating, by using the third model, the response based on the at least one query, the contextual information, and the at least one prompt.

In accordance with an exemplary embodiment, the response may be generated in the natural language format by using the third model.

In accordance with an exemplary embodiment, each of the first model, the second model, and the third model may include at least one from among a large language model, a deep learning model, a neural network model, a natural language processing model, a machine learning model, a mathematical model, and a process model.

According to an aspect of the present disclosure, a computing device configured to implement an execution of a method for facilitating automated information management by using predictive analytics is disclosed. The computing device including a processor; a memory; and a communication interface coupled to each of the processor and the memory, wherein the processor may be configured to receive, via a graphical user interface, at least one request, each of the at least one request may include a question in a natural language format; generate, by using a first model, at least one query based on the question, each of the at least one query may correspond to a stand-alone component of the question; identify, from a data repository, at least one data section for each of the at least one query, each of the at least one data section may relate to a page in an electronic document; determine, by using a second model, contextual information for each of the at least one query from the corresponding at least one data section; and generate, by using a third model, a response for each of the at least one request based on the at least one query and the corresponding contextual information.

In accordance with an exemplary embodiment, the processor may be further configured to generate rationale information for the response, the rationale information may include a logical basis for the response; generate at least one graphical element for the response, each of the at least one graphical element may relate to a graphical representation of the response and the rationale information; and display, via the graphical user interface, the at least one graphical element.

In accordance with an exemplary embodiment, to generate the at least one query, the processor may be further configured to decompose, by using the first model, the question into the at least one query; identify, by using the first model, at least one query characteristic for each of the at least one query, the at least one query characteristic may include at least one from among a name characteristic and a time characteristic; and associate the at least one query characteristic with the corresponding at least one query.

In accordance with an exemplary embodiment, to identify the at least one data section for each of the at least one query, the processor may be further configured to retrieve, from the data repository, at least one document based on a corresponding at least one query characteristic; identify a document context for each of the at least one document; and rank the at least one document based on the document context, a frequency of at least one query term, and a length attribute.

In accordance with an exemplary embodiment, the processor may be further configured to determine a selection of the at least one document based on a result of the ranking; and identify the at least one data section from the selection.

In accordance with an exemplary embodiment, to determine the contextual information for each of the at least one query, the processor may be further configured to extract, by using the second model, at least one data set from an organizational structure of the at least one data section, the organizational structure may include at least one from among a paragraph structure and a table structure; and determine, by using the second model, the contextual information based on a classification of the at least one data set.

In accordance with an exemplary embodiment, to generate the response for each of the at least one request, the processor may be further configured to determine, by using the third model, at least one prompt based on the at least one query, the contextual information, and at least one in-context learning sample; and generate, by using the third model, the response based on the at least one query, the contextual information, and the at least one prompt.

In accordance with an exemplary embodiment, the processor may be further configured to generate the response in the natural language format by using the third model.

In accordance with an exemplary embodiment, each of the first model, the second model, and the third model may include at least one from among a large language model, a deep learning model, a neural network model, a natural language processing model, a machine learning model, a mathematical model, and a process model.

According to an aspect of the present disclosure, a non-transitory computer readable storage medium storing instructions for facilitating automated information management by using predictive analytics is disclosed. The storage medium including executable code which, when executed by a processor, may cause the processor to receive, via a graphical user interface, at least one request, each of the at least one request may include a question in a natural language format; generate, by using a first model, at least one query based on the question, each of the at least one query may correspond to a stand-alone component of the question; identify, from a data repository, at least one data section for each of the at least one query, each of the at least one data section may relate to a page in an electronic document; determine, by using a second model, contextual information for each of the at least one query from the corresponding at least one data section; and generate, by using a third model, a response for each of the at least one request based on the at least one query and the corresponding contextual information.

In accordance with an exemplary embodiment, when executed by the processor, the executable code may further cause the processor to generate rationale information for the response, the rationale information may include a logical basis for the response; generate at least one graphical element for the response, each of the at least one graphical element may relate to a graphical representation of the response and the rationale information; and display, via the graphical user interface, the at least one graphical element.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
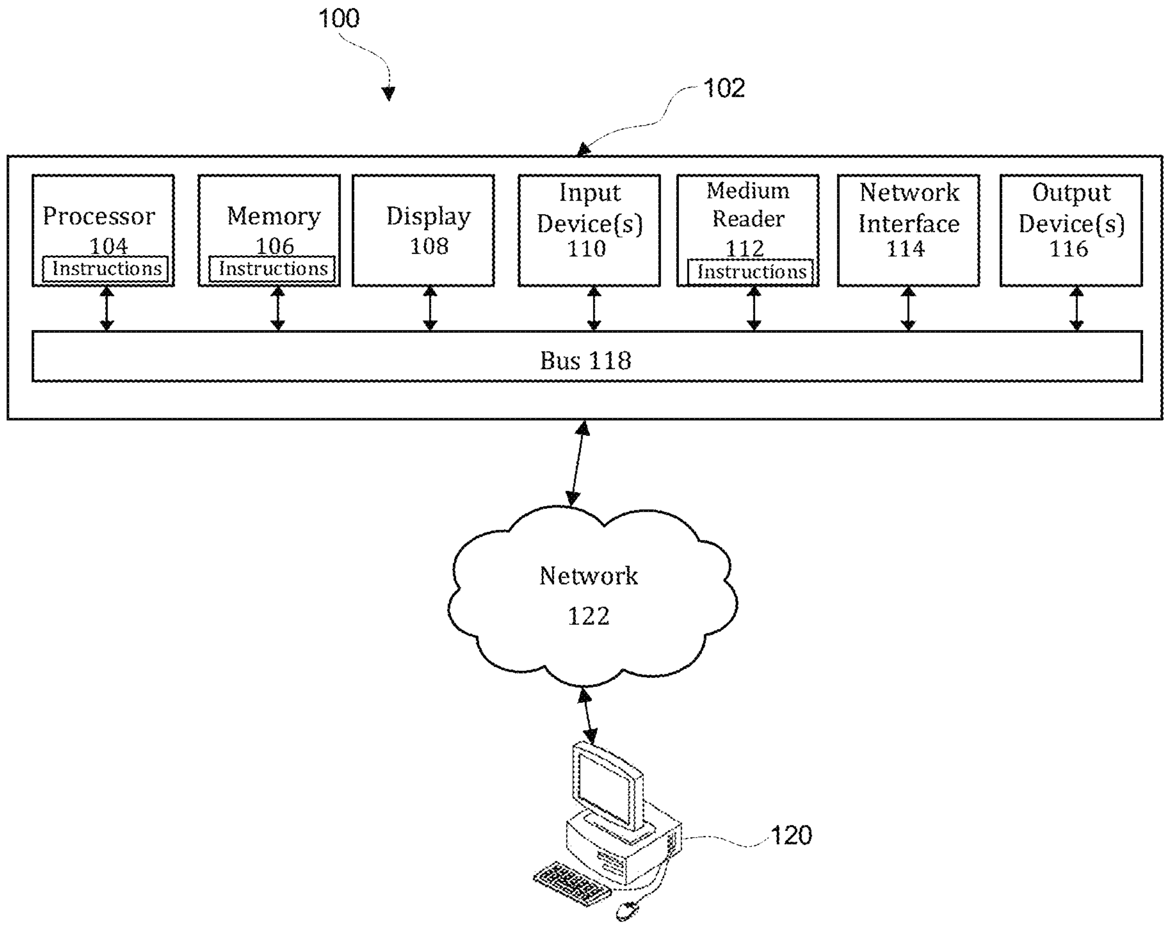
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated information management by leveraging machine learning and artificial intelligence to automatically identify, extract, and contextualize natural language data.

Figure 2:
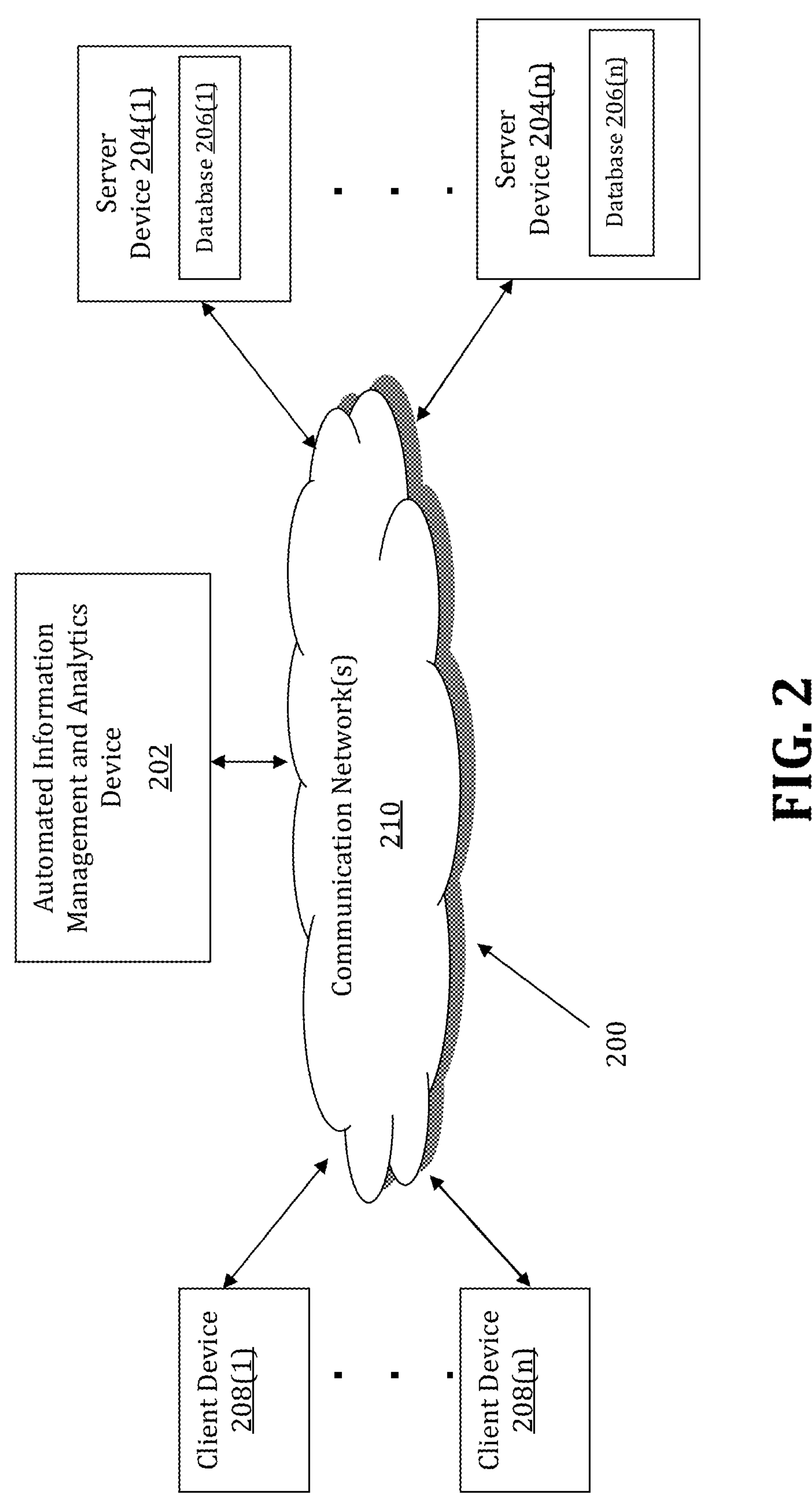
FIG. 2 illustrates an exemplary diagram of a network environment.

Referring to FIG. 2, a schematic of an exemplary network environment 200 for implementing a method for facilitating automated information management by leveraging machine learning and artificial intelligence to automatically identify, extract, and contextualize natural language data is illustrated. In an exemplary embodiment, the method is executable on any networked computer platform, such as, for example, a personal computer (PC).

The method for facilitating automated information management by leveraging machine learning and artificial intelligence to automatically identify, extract, and contextualize natural language data may be implemented by an Automated Information Management and Analytics (AIMA) device 202. The AIMA device 202 may be the same or similar to the computer system 102 as described with respect to FIG. 1. The AIMA device 202 may store one or more applications that can include executable instructions that, when executed by the AIMA device 202, cause the AIMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AIMA device 202 itself, may be located in virtual server(s) running in a cloud-based computing environment rather than being tied to one or more specific physical network computing devices. Also, the application(s) may be running in one or more virtual machines (VMs) executing on the AIMA device 202. Additionally, in one or more embodiments of this technology, virtual machine(s) running on the AIMA device 202 may be managed or supervised by a hypervisor.

In the network environment 200 of FIG. 2, the AIMA device 202 is coupled to a plurality of server devices **204(1)-204(*n*) that hosts a plurality of databases 206(1)-206(*n*), and also to a plurality of client devices 208(1)-208(*n*) via communication network(s) 210. A communication interface of the AIMA device 202, such as the network interface 114 of the computer system 102 of FIG. 1, operatively couples and communicates between the AIMA device 202, the server devices 204(1)-204**(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AIMA device 202, the server devices 204 (1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AIMA devices that efficiently implement a method for facilitating automated information management by leveraging machine learning and artificial intelligence to automatically identify, extract, and contextualize natural language data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AIMA device 202 may be a standalone device or integrated with one or more other devices or apparatuses, such as one or more of the server devices 204(1)-204(*n*), for example. In one particular example, the AIMA device 202 may include or be hosted by one of the server devices 204(1)-204(*n*), and other arrangements are also possible. Moreover, one or more of the devices of the AIMA device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the AIMA device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store data that relates to requests, questions, natural language data, machine learning models, queries, data sections, electronic documents, contextual information, and responses.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the AIMA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the AIMA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the AIMA device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AIMA device 202, the server devices 204(1)-204(*n*), or the client devices 208(1)-208(*n*), for example, may be configured to operate as virtual instances on the same physical machine. In other words, one or more of the AIMA device 202, the server devices 204 (1)-204(*n*), or the client devices 208(1)-208(*n*) may operate on the same physical device rather than as separate devices communicating through communication network(s) 210. Additionally, there may be more or fewer AIMA devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
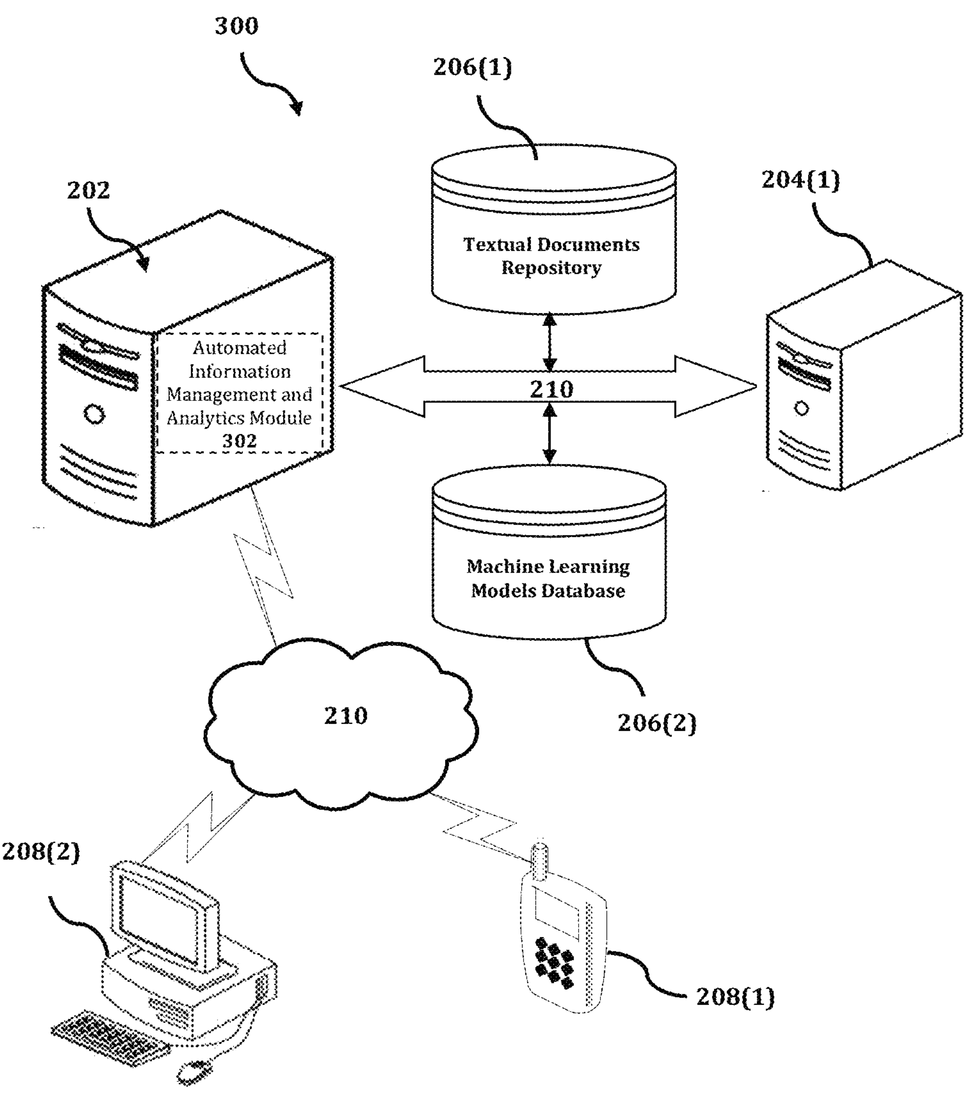
FIG. 3 shows an exemplary system for implementing a method for facilitating automated information management by leveraging machine learning and artificial intelligence to automatically identify, extract, and contextualize natural language data.

The AIMA device 202 is described and shown in FIG. 3 as including an automated information management and analytics module 302, although it may include other rules, policies, modules, databases, or applications, for example. As will be described below, the automated information management and analytics module 302 is configured to implement a method for facilitating automated information management by leveraging machine learning and artificial intelligence to automatically identify, extract, and contextualize natural language data.

An exemplary process 300 for implementing a mechanism for facilitating automated information management by leveraging machine learning and artificial intelligence to automatically identify, extract, and contextualize natural language data by utilizing the network environment of FIG. 2 is shown as being executed in FIG. 3. Specifically, a first client device 208(1) and a second client device 208(2) are illustrated as being in communication with AIMA device 202. In this regard, the first client device 208(1) and the second client device 208(2) may be "clients" of the AIMA device 202 and are described herein as such. Nevertheless, it is to be known and understood that the first client device 208(1) and/or the second client device 208(2) need not necessarily be "clients" of the AIMA device 202, or any entity described in association therewith herein. Any additional or alternative relationship may exist between either or both of the first client device 208(1) and the second client device 208(2) and the AIMA device 202, or no relationship may exist.

Further, AIMA device 202 is illustrated as being able to access a textual documents repository 206(1) and a machine learning models database 206(2). The automated information management and analytics module 302 may be configured to access these databases for implementing a method for facilitating automated information management by leveraging machine learning and artificial intelligence to automatically identify, extract, and contextualize natural language data.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AIMA device 202 via broadband or cellular communication. Of course, these embodiments are merely exemplary and are not limiting or exhaustive.

Upon being started, the automated information management and analytics module 302 executes a process for facilitating automated information management by leveraging machine learning and artificial intelligence to automatically identify, extract, and contextualize natural language data. An exemplary process for facilitating automated information management by leveraging machine learning and artificial intelligence to automatically identify, extract, and contextualize natural language data is generally indicated at flowchart 400 in FIG. 4.

Figure 4:
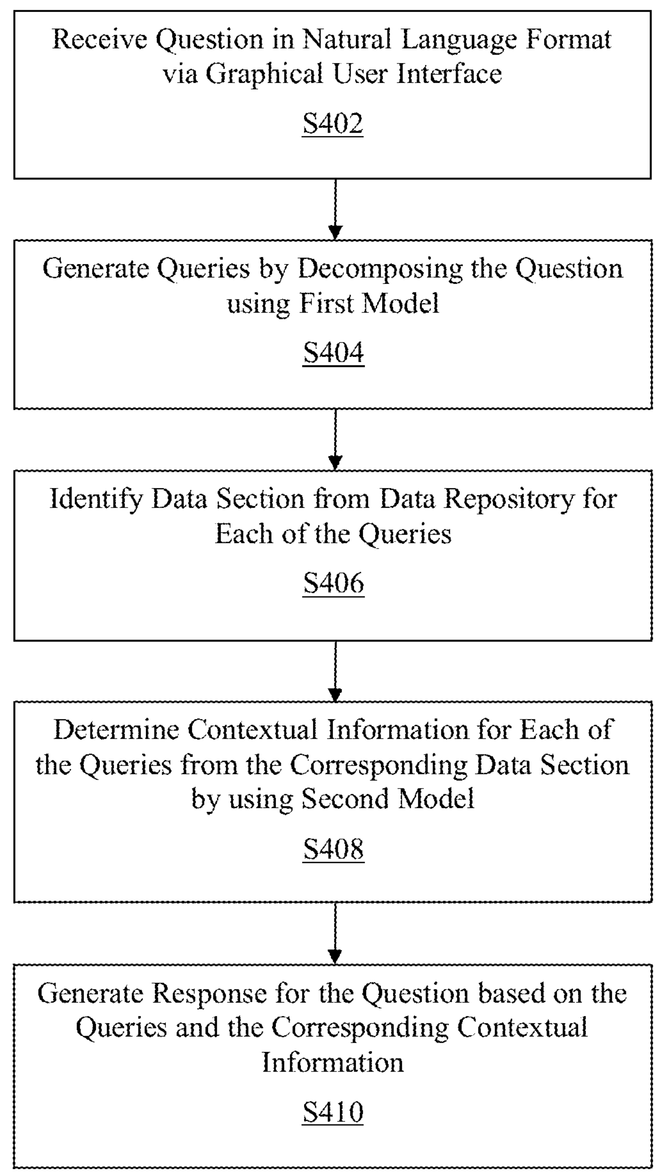
FIG. 4 is a flowchart of an exemplary process for implementing a method for facilitating automated information management by leveraging machine learning and artificial intelligence to automatically identify, extract, and contextualize natural language data.

In the process 400 of FIG. 4, at step S402, requests may be received via a graphical user interface. Each of the requests may include a question in a natural language format. In an exemplary embodiment, the requests may include inputs from a user that was received via the graphical user interface. The requests may relate to instructions for a computing component that provides information such as, for example, a user question for further processing. For example, questions that the user inputs in the graphical user interface may be bundled as a request for subsequent processing components in a question and answering pipeline.

In another exemplary embodiment, the graphical user interface may correspond to a type of user interface that enables the user to interact with computing components through graphical icons. The graphical user interface may be implemented with graphical icons such as, for example, windows and menus to enable the user to carry out commands such as, for example, to ask a question.

In another exemplary embodiment, the question may relate to a linguistic expression such as, for example, a sentence in a natural language format that is worded to elicit information. The question may present the linguistic expression in a natural language such as, for example, an English language to elicit information in a similar and/or different natural language. Consistent with present disclosures, the question may be usable to elicit information as well as provide instructions for a computing process such as, for example, a question and answering computing process, a search computing process, a summarization of information computing process, as well as a reasoning of the information computing process.

At step S404, queries may be generated based on the question. In an exemplary embodiment, each of the queries may correspond to a stand-alone component of the question. The queries may relate to individual components of the question that addresses a particular subject matter. The individual components may focus on the particular subject matter to enable efficient and effective identification of relevant data. For example, a question relating to a comparison of gross margin decline for company A and company B may be decomposed into a first query for gross margin decline data for company A and a second query for gross margin decline data for company B.

In another exemplary embodiment, the queries may be automatically generated by using a first model. The first model may be usable to decompose the question into individual queries consistent with present disclosures. For example, a large language model with few-shot learning may be used to effectively divide the question into the stand-alone components.

In another exemplary embodiment, the first model may include at least one from among a large language model, a deep learning model, a neural network model, a natural language processing model, a machine learning model, a mathematical model, and a process model. The first model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the machine learning process may include a neural network that relates to at least one from among an artificial neural network and a simulated neural network. The neural network may correspond to a technique in artificial intelligence that teaches computers to process data by using interconnected processing nodes and/or artificial neurons. The neural network may relate to a type of machine learning such as, for example, deep learning that uses interconnected nodes and/or artificial neurons in a layered structure to transform inputs for predictive analytics.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the large language model may relate to a trained deep-learning model that understands and generates text in a human-like fashion. The large language model may recognize, summarize, translate, predict, and generate various types of text as well as content based on knowledge gained from massive data sets. In another exemplary embodiment, the large language model may correspond to a language model that consists of a neural network with many parameters such as, for example, weights. The language model may be trained on large quantities of unlabeled and labeled text by using self-supervised learning or semi-supervised learning. The trained language model may be usable to capture syntax and semantics of human language.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

In another exemplary embodiment, query characteristics may be associated with each of the queries to enable identification of relevant data such as, for example, relevant annual reports. To facilitate the association, the question may initially be decomposed into the queries by using the first model consistent with present disclosures. Each of the queries may relate to individual stand-alone components of the question.

Then, query characteristics may be automatically identified for each of the queries by using the first model. The query characteristics may provide supplemental information that assists in the identification of the relevant data. The query characteristics may relate to any individual characteristic of the queries that assists in locating documents which may contain answers to the queries. For example, the query characteristics may include a name characteristic such as a company name and a time characteristic such as a specified year. That is, query characteristics may indicate that relevant data for a particular query relates to company A for year B. As such, a determination may be made that the relevant data may be found in an annual report for company A that was published in year B. The query characteristics may be associated with the corresponding query by using any association process such as, for example, by storing the association as metadata for the corresponding query.

At step S406, data sections may be identified for each of the queries. The data sections may be automatically identified from a data repository such as, for example, a corpus of financial documents. In an exemplary embodiment, each of the data sections may relate to a page in an electronic document such as, for example, a portable document format (PDF) document. The identification of the data sections may relate to a preliminary retrieval step that broadly identifies relevant data in the data repository. For example, the queries and associated query characteristics may be usable to identify pages from specific annual reports that are likely to include the relevant data.

In another exemplary embodiment, to facilitate the identification of the sections, documents may be retrieved from the data repository for each of the queries. The documents may be retrieved from the data repository based on the corresponding query characteristic. Then, document context may be identified for each of the documents. The document context may relate to relevant coarse level context that corresponds to the queries.

Additionally, various attributes may also be identified for each of the documents. The attributes may include a frequency of query terms attribute and a length attribute. The frequency of query terms attribute may relate to a first value that represents how frequently query terms appear in the documents. The length attribute may relate to a second value that represents how much information the documents contain. Finally, the documents may be ranked based on the document context, the frequency attribute, and the length attribute. For example, the documents may be ranked in order of importance by using the frequency of query terms and the length of the documents.

In another exemplary embodiment, a selection of the documents may be determined based on a result of the ranking. The selection may include documents that are most likely to include the relevant data. For example, the selection may include the top three documents in the ranking, which indicates that these three documents are most likely to include the relevant data. Then, the data sections may be identified from within the selection of documents. Consistent with present disclosures, the ranking of the documents based on importance may be performed by using at least one from among a probabilistic algorithm and a numerical representation algorithm.

At step S408, contextual information may be determined for each of the queries from the corresponding data sections. The contextual information may be automatically determined by using a second model. In an exemplary embodiment, the contextual information may relate to data that have been determined to be relevant for answering the queries. The contextual information may include at least one from among a paragraph, a sentence, and a table that contain the relevant data. The contextual information may be identified from the data sections for each of the queries. The identification of the contextual information may relate to a fine grained retrieval process to identify relevant contexts for each of the queries.

In another exemplary embodiment, to facilitate the determination of the contextual information, data sets may be extracted by using the second model. The data sets may include relevant data that have been extracted from an organizational structure of the data section. Consistent with present disclosures, the organizational structure may include at least one from among a paragraph structure, a sentence structure, and a table structure. Then, the contextual information may be determined by using the second model based on a classification of the data sets. In another exemplary embodiment, an algorithm such as, for example, a classifier algorithm may be employed for context identification and ranking of the contextual information. The relevant contextual information may be ranked according to a significance in addressing the queries.

In another exemplary embodiment, consistent with present disclosures, the second model may include at least one from among a large language model, a deep learning model, a neural network model, a natural language processing model, a machine learning model, a mathematical model, and a process model.

At step S410, a response may be generated for each of the requests based on the queries and the corresponding contextual information. The response may be automatically generated for each of the requests by using a third model. In an exemplary embodiment, the response may relate to an answer that has been generated for questions contained in the requests. The response may include extracted information that have been directly identified from the contextual information as well as reasoned information that have been determined by using the contextual information and the queries. The response may be generated in the natural language format by using the third model.

In another exemplary embodiment, to facilitate the generating of the response, prompts may be determined based on the queries, the contextual information, and in-context learning samples. The prompts may relate to instructions that are usable for machine learning models such as, for example, large language models. The prompts may be usable to facilitate interactions with the machine learning models to accomplish a specified task. The prompts may be automatically determined by the third model as well as for the third model. Then, the response may be generated by using the third model based on the query, the contextual information, and the prompts. For example, a large language model may employ self-consistency principles in combination with chain of thought prompting to generate reliable answers to the questions by using the queries and the contextual information.

In another exemplary embodiment, consistent with present disclosures, the third model may include at least one from among a large language model, a deep learning model, a neural network model, a natural language processing model, a machine learning model, a mathematical model, and a process model.

In another exemplary embodiment, the response may be provided to a user via the graphical user interface. Prior to providing the response, rationale information may be generated for the response. The rationale information may include a description of a logical basis for the response. The description may detail at least one from among a factual task and a reasoning task that was necessary for the generating of the response.

The factual task may include a process for directly extracting the response from the data sections. For example, the factual task may include the identification and direct extraction of profit data for company A from a corresponding annual report. Alternatively, the reasoning task may include reasoning steps that are necessary to derive the response from the queries and the corresponding contextual information. The reasoning steps may include an operation such as, for example, an additive operation and a subtractive operation that manipulates the contextual information to derive the response. For example, to compare a gross margin decline between company B and company C for a given time period, extracted gross margin data for each of the two companies may be identified and manipulated to derive the response. Consistent with present disclosures, the rationale information may provide an explanation for the response.

Then, graphical elements may be generated for the response. The graphical elements may relate to graphical representations of the response and the rationale information. The graphical elements may include visual representations such as, for example, tables and charts that organizes the response and the rationale information for presentation on the graphical user interface. The graphical elements may indicate relationships, hierarchies, and visually emphasize data in the response and the rationale information.

Finally, the graphical elements may be displayed on the graphical user interface for the user. The graphical elements may be displayed for the user in response to the received requests. For example, the user may ask a question via inputs on the graphical user interface and receive the response as graphical elements that are displayed on the graphical user interface.

In another exemplary embodiment, the response may be provided to a downstream computing component such as, for example, a downstream application via an application programming interface. The response may be provided to the downstream application to facilitate additional downstream tasks. For example, the response may be provided to a downstream trading platform that enables a user to initiate trading actions according to the response.

In another exemplary embodiment, the applications described in the present disclosure may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

Figure 5:
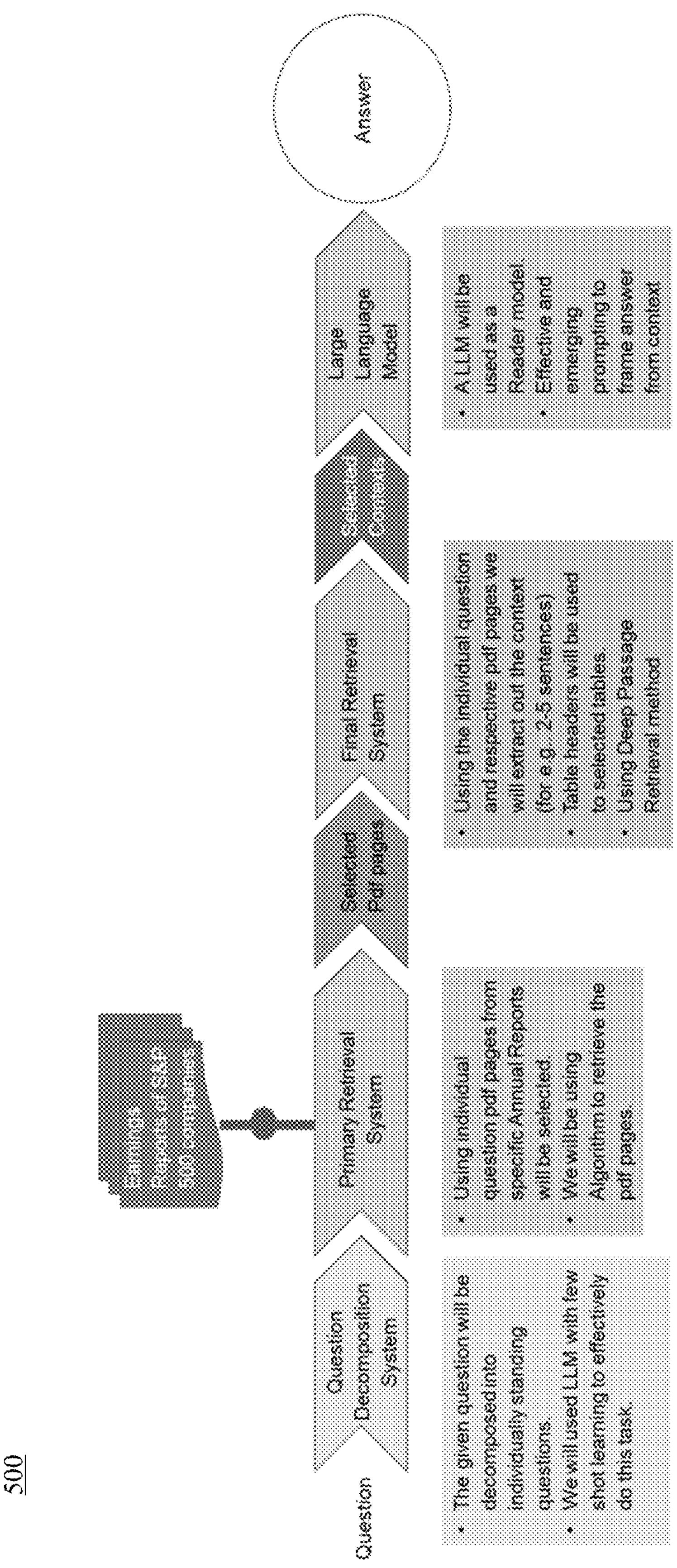
FIG. 5 is a diagram of an exemplary pipeline for implementing a method for facilitating automated information management by leveraging machine learning and artificial intelligence to automatically identify, extract, and contextualize natural language data.

FIG. 5 is a diagram 500 of an exemplary pipeline for implementing a method for facilitating automated information management by leveraging machine learning and artificial intelligence to automatically identify, extract, and contextualize natural language data. In FIG. 5, an end-to-end pipeline for hierarchically analyzing and extracting information from documents such as, for example, financial documents is provided. The pipeline may improve the accuracy of information management by leveraging artificial intelligence and machine learning to provide more insightful data for better-informed decisions.

As illustrated in FIG. 5, the pipeline begins when a question is received. The question is passed to a question decomposition system that decomposes the question into individual queries, which are stand-alone components of the question. A large language model may be used with few-shot learning to effectively decompose the question. Then, the queries are usable by the primary retrieval system to select relevant documents from a data repository and retrieve relevant pages.

The retrieved pages may be passed to a final retrieval system which identifies contextual information for each of the queries within the corresponding pages. The final retrieval system may utilize deep passage retrieval methods as well as table headers to extract the contextual information. Finally, the contextual information may be passed to a reader module, which uses the queries and the corresponding contextual information to generate answers for the question. The reader module may employ a large language model as well as effective and emerging prompting to frame the answer from context.

Figure 6:
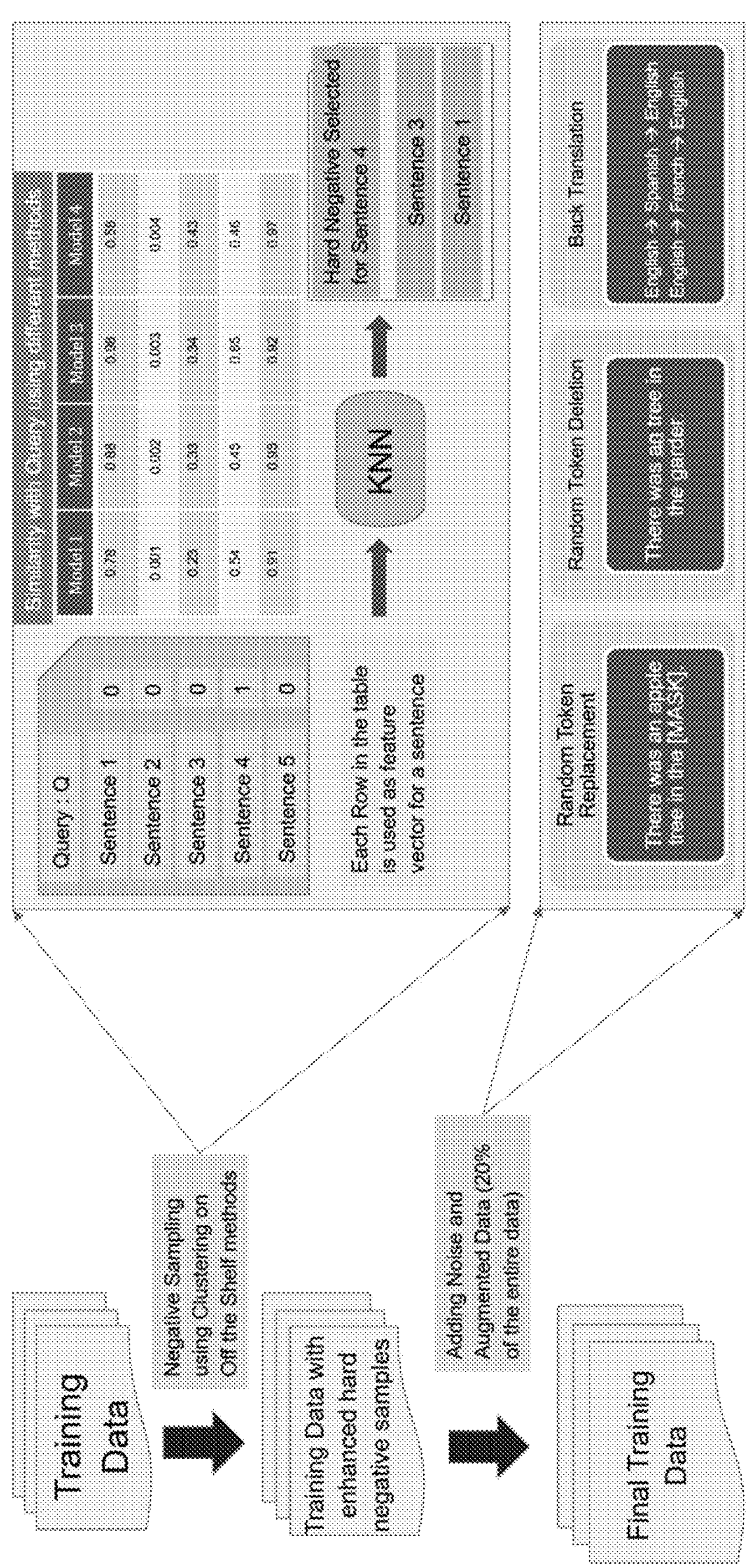
FIG. 6 is a flow diagram of an exemplary final retrieval process for implementing a method for facilitating automated information management by leveraging machine learning and artificial intelligence to automatically identify, extract, and contextualize natural language data.

FIG. 6 is a flow diagram 600 of an exemplary final retrieval process for implementing a method for facilitating automated information management by leveraging machine learning and artificial intelligence to automatically identify, extract, and contextualize natural language data. In FIG. 6, a negative sampling technique is provided that may be usable in the final retrieval process to identify contextual data. The negative sampling technique may be usable with machine learning models disclosed in the present disclosure as well as any off-the-shelf machine learning solution.

As illustrated in FIG. 6, a negative sampling approach may be implemented for preparation of training data that is usable by a machine learning model to facilitate the final retrieval process. The negative sampling approach may include preparation of training data by using negative sampling processes. The negative sampling processes may utilize clustering on off-the-shelf machine learning techniques to prepare training data and generate training data sets with enhanced hard negative samples. For example, hard negatives may be selected for particular queries.

Then, noise and augmented data may be added to the training data sets. For example, the training data sets may be augmented with random token replacement, random token deletion, as well as back translation in various natural language formats. A final training data set may be generated that incorporates the aforementioned noise and augmented data. The final training data set may be usable with the machine learning models described in the present disclosure to improve the final retrieval process for contextual data.

Figure 7:
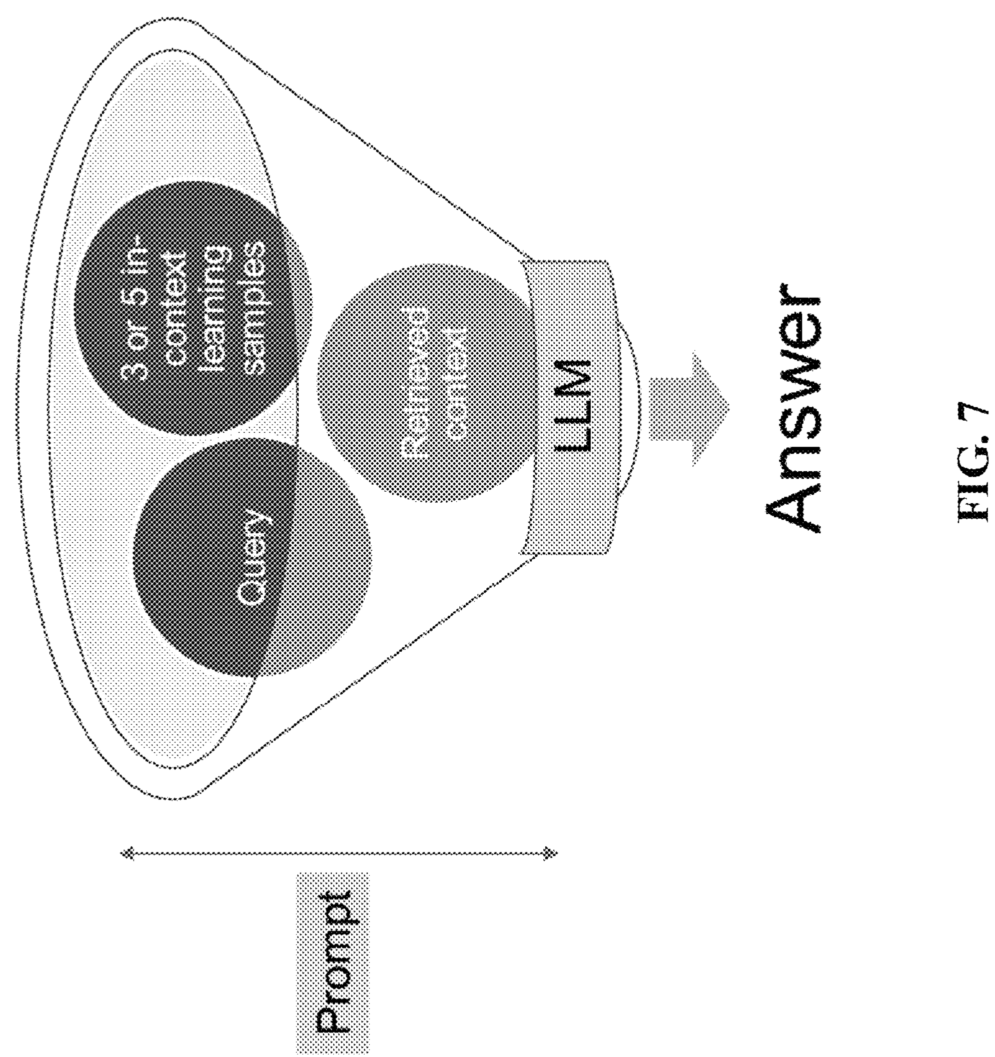
FIG. 7 is an architecture diagram of an exemplary reader process for implementing a method for facilitating automated information management by leveraging machine learning and artificial intelligence to automatically identify, extract, and contextualize natural language data.

FIG. 7 is an architecture diagram 700 of an exemplary reader process for implementing a method for facilitating automated information management by leveraging machine learning and artificial intelligence to automatically identify, extract, and contextualize natural language data. In FIG. 6, the reader module may utilize a state-of-the-art large language model, which employs self-consistency in combination with chain of thought prompting to generate a reliable answer to the question. As illustrated in FIG. 6, the large language model processes the queries, the contextual information, and in-context learning samples to generate the answer.

Accordingly, with this technology, an optimized process for facilitating automated information management by leveraging machine learning and artificial intelligence to automatically identify, extract, and contextualize natural language data is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated information management by using predictive analytics, the method being implemented by at least one processor, the method comprising:

receiving, by the at least one processor via a graphical user interface displaying a plurality of graphical icons that allow for interactions with a plurality of computing components, at least one request, each of the at least one request including a question in a natural language format;

generating, by the at least one processor using a first artificial intelligence model, a plurality of individual queries based on the question, each of the plurality of individual queries corresponding to a stand-alone component of the question directed to differing subject matters, wherein the first artificial intelligence model has been trained on training data and further trainable on additional data, prior false positive rate and false negative rate of the first artificial intelligence model, wherein the training data is prepared using negative sampling process and include noise and augmented data, and wherein the generating of the plurality of individual queries further comprises:

decomposing, by the at least one processor using the first artificial intelligence model, the question into the plurality of individual queries;

identifying, by the at least one processor using the first artificial intelligence model, at least one query characteristic for each of the plurality of individual queries, the at least one query characteristic including at least one from among a name characteristic and a time characteristic; and associating, by the at least one processor, the at least one query characteristic with a corresponding query among the plurality of individual queries;

identifying, from a data repository including a plurality of electronic documents based on characteristic of the corresponding query, at least one data section for each of the plurality of individual queries, each of the at least one data section relating to a page in an electronic document among the plurality of electronic documents;

identifying, for each of the plurality of electronic documents, a plurality of attributes, the plurality of attributes including a frequency of a term and a length attribute indicating an amount of information contained;

determining, by the at least one processor using a second artificial intelligence model, contextual information for each of the plurality of individual queries from the corresponding at least one data section identified from the data repository, wherein the determining of the contextual information includes extracting, via the second artificial intelligence model and based on an organizational structure of the at least one data section, a plurality of data sets for facilitating determination of the contextual information, wherein the organizational structure includes at least one of a paragraph structure, a sentence structure and a table structure;

automatically generating, by the at least one processor using a third artificial intelligence model, a response for each of the at least one request based on the plurality of individual queries and the corresponding contextual information, wherein the response includes information of the extracted plurality of data sets and reasoned information determined using the contextual information, wherein the automatically generating the response includes directly extracting the response from the extracted plurality of data sets from the plurality of electronic documents, and wherein the response includes a plurality of graphical elements that visually represents relationships and hierarchies of the plurality of electronic documents; and presenting, via the graphical user interface, the automatically generated response including the information of the extracted plurality of data sets from the plurality of electronic documents.

2. The method of claim 1, further comprising:

generating, by the at least one processor, rationale information for the response, the rationale information including a logical basis for the response, wherein the plurality of graphical elements includes at least one graphical element relating to a graphical representation of the response and the rationale information; and displaying, by the at least one processor via the graphical user interface, the at least one graphical element.

3. The method of claim 1, wherein the identifying of the at least one data section for each of the plurality of individual queries further comprises:

identifying, by the at least one processor, a document context for each of the plurality of electronic documents; and ranking, by the at least one processor, the plurality of electronic documents based on the document context, a frequency of at least one query term, and a length attribute.

4. The method of claim 3, further comprising:

determining, by the at least one processor, a selection of at least one of the plurality of electronic documents based on a result of the ranking; and identifying, by the at least one processor, the at least one data section from the selection.

5. The method of claim 1, wherein the determining of the contextual information for each of the plurality of individual queries further comprises:

extracting, by the at least one processor using the second artificial intelligence model, at least one data set from an organizational structure of the at least one data section, the organizational structure including at least one from among a paragraph structure and a table structure; and determining, by the at least one processor using the second artificial intelligence model, the contextual information based on a classification of the at least one data set.

6. The method of claim 1, wherein the generating of the response for each of the at least one request further comprises:

determining, by the at least one processor using the third artificial intelligence model, at least one prompt based on the plurality of individual queries, the contextual information, and at least one in-context learning sample; and generating, by the at least one processor using the third artificial intelligence model, the response based on the plurality of individual queries, the contextual information, and the at least one prompt.

7. The method of claim 6, wherein the response is generated in the natural language format by using the third artificial intelligence model.

8. A computing device configured to implement an execution of a method for facilitating automated information management by using predictive analytics, the computing device comprising:

a processor;

a memory; and a communication interface coupled to each of the processor and the memory, wherein the processor is configured to:

receive, via a graphical user interface displaying a plurality of graphical icons that allow for interactions with a plurality of computing components, at least one request, each of the at least one request including a question in a natural language format;

generate, by using a first artificial intelligence model, a plurality of individual queries based on the question, each of the plurality of individual queries corresponding to a stand-alone component of the question directed to differing subject matters, wherein the first artificial intelligence model has been trained on training data and further trainable on additional data, prior false positive rate and false negative rate of the first artificial intelligence model, wherein the training data is prepared using negative sampling process and include noise and augmented data, and wherein generation of the plurality of individual queries further comprises:

decomposing, using the first artificial intelligence model, the question into the plurality of individual queries;

identifying, using the first artificial intelligence model, at least one query characteristic for each of the plurality of individual queries, the at least one query characteristic including at least one from among a name characteristic and a time characteristic; and associating the at least one query characteristic with a corresponding query among the plurality of individual queries;

identify, from a data repository including a plurality of electronic documents based on characteristic of the corresponding query, at least one data section for each of the plurality of individual queries, each of the at least one data section relating to a page in an electronic document among the plurality of electronic documents;

identify, for each of the plurality of electronic documents, a plurality of attributes, the plurality of attributes including a frequency of a term and a length attribute indicating an amount of information contained;

determine, by using a second artificial intelligence model, contextual information for each of the plurality of individual queries from the corresponding at least one data section identified from the data repository, wherein determination of the contextual information includes extracting, via the second artificial intelligence model and based on an organizational structure of the at least one data section, a plurality of data sets for facilitating determination of the contextual information, wherein the organizational structure includes at least one of a paragraph structure, a sentence structure and a table structure;

automatically generate, by using a third artificial intelligence model, a response for each of the at least one request based on the plurality of individual queries and the corresponding contextual information, wherein the response includes information of the extracted plurality of data sets and reasoned information determined using the contextual information, wherein automated generation of the response includes directly extracting the response from the extracted plurality of data sets from the plurality of electronic documents, and wherein the response includes a plurality of graphical elements that visually represents relationships and hierarchies of the plurality of electronic documents; and present, via the graphical user interface, the automatically generated response including the information of the extracted plurality of data sets from the plurality of electronic documents.

9. The computing device of claim 8, wherein the processor is further configured to:

generate rationale information for the response, the rationale information including a logical basis for the response, wherein the plurality of graphical elements includes at least one graphical element relating to a graphical representation of the response and the rationale information; and display, via the graphical user interface, the at least one graphical element.

10. The computing device of claim 8, wherein, to identify the at least one data section for each of the plurality of individual queries, the processor is further configured to:

identify a document context for each of the plurality of electronic documents; and rank the plurality of electronic documents based on the document context, a frequency of at least one query term, and a length attribute.

11. The computing device of claim 10, wherein the processor is further configured to:

determine a selection of the at least one of the plurality of electronic documents based on a result of the ranking; and identify the at least one data section from the selection.

12. The computing device of claim 8, wherein, to determine the contextual information for each of the plurality of individual queries, the processor is further configured to:

extract, by using the second artificial intelligence model, at least one data set from an organizational structure of the at least one data section, the organizational structure including at least one from among a paragraph structure and a table structure; and determine, by using the second artificial intelligence model, the contextual information based on a classification of the at least one data set.

13. The computing device of claim 8, wherein, to generate the response for each of the at least one request, the processor is further configured to:

determine, by using the third artificial intelligence model, at least one prompt based on the plurality of individual queries, the contextual information, and at least one in-context learning sample; and generate, by using the third artificial intelligence model, the response based on the plurality of individual queries, the contextual information, and the at least one prompt.

14. The computing device of claim 13, wherein the processor is further configured to generate the response in the natural language format by using the third artificial intelligence model.

15. A non-transitory computer readable storage medium storing instructions for facilitating automated information management by using predictive analytics, the storage medium comprising executable code which, when executed by a processor, causes the processor to:

receive, via a graphical user interface displaying a plurality of graphical icons that allow for interactions with a plurality of computing components, at least one request, each of the at least one request including a question in a natural language format;

generate, by using a first artificial intelligence model, a plurality of individual queries based on the question, each of the plurality of individual queries corresponding to a stand-alone component of the question directed to differing subject matters, wherein the first artificial intelligence model has been trained on training data and further trainable on additional data, prior false positive rate and false negative rate of the first artificial intelligence model, wherein the training data is prepared using negative sampling process and include noise and augmented data, and wherein generation of the plurality of individual queries further comprises:

decomposing, using the first artificial intelligence model, the question into the plurality of individual queries;

identifying, using the first artificial intelligence model, at least one query characteristic for each of the plurality of individual queries, the at least one query characteristic including at least one from among a name characteristic and a time characteristic; and associating the at least one query characteristic with a corresponding query among the plurality of individual queries;

identify, from a data repository including a plurality of electronic documents based on characteristic of the corresponding query, at least one data section for each of the plurality of individual queries, each of the at least one data section relating to a page in an electronic document among the plurality of electronic documents;

identify, for each of the plurality of electronic documents, a plurality of attributes, the plurality of attributes including a frequency of a term and a length attribute indicating an amount of information contained;

determine, by using a second artificial intelligence model, contextual information for each of the plurality of individual queries from the corresponding at least one data section identified from the data repository, wherein determination of the contextual information includes extracting, via the second artificial intelligence model and based on an organizational structure of the at least one data section, a plurality of data sets for facilitating determination of the contextual information, wherein the organizational structure includes at least one of a paragraph structure, a sentence structure and a table structure;

automatically generate, by using a third artificial intelligence model, a response for each of the at least one request based on the plurality of individual queries and the corresponding contextual information, wherein the response includes information of the extracted plurality of data sets and reasoned information determined using the contextual information, wherein automated generation of the response includes directly extracting the response from the extracted plurality of data sets from the plurality of electronic documents, and wherein the response includes a plurality of graphical elements that visually represents relationships and hierarchies of the plurality of electronic documents; and present, via the graphical user interface, the automatically generated response including the information of the extracted plurality of data sets from the plurality of electronic documents.

16. The storage medium of claim 15, wherein, when executed by the processor, the executable code further causes the processor to:

generate rationale information for the response, the rationale information including a logical basis for the response;

generate at least one graphical element for the response, each of the at least one graphical element relating to a graphical representation of the response and the rationale information; and display, via the graphical user interface, the at least one graphical element.

* * * * *